United States Patent [19]

Masuda et al.

[11] Patent Number: 5,479,312
[45] Date of Patent: Dec. 26, 1995

[54] TAPE CARTRIDGE SYSTEM IMPLEMENTING VARIABLE SIZED TAPE CARTRIDGES DESIGNED FOR USE ON THE SAME RECORDING/REPRODUCING APPARATUS

[75] Inventors: Kenmei Masuda, Yokohama; Hidekazu Takeda; Tatsumi Nishijima, both of Hiratsuka; Hikaru Mizutani, Toyonaka; Yoshimi Maehara, Otsu, all of Japan

[73] Assignees: Hitachi Maxell, Ltd., Osaka; Hitachi, Ltd., Tokyo, Japan

[21] Appl. No.: 260,980

[22] Filed: Jun. 15, 1994

[30] Foreign Application Priority Data

Jun. 15, 1993 [JP] Japan .................................. 5-169558

[51] Int. Cl.⁶ .......................... G11B 23/30; G11B 23/04
[52] U.S. Cl. ................ 360/132; 360/91; 360/94
[58] Field of Search ........................... 360/132, 94, 60, 360/91–92

[56] References Cited

U.S. PATENT DOCUMENTS

| | | | |
|---|---|---|---|
| 4,864,448 | 9/1989 | Karibe et al. | 360/60 |
| 5,055,947 | 10/1991 | Satoh | 360/62 |
| 5,216,565 | 6/1993 | Yamaguchi | 360/132 |
| 5,335,129 | 8/1994 | Edakubo et al. | 360/132 |
| 5,390,870 | 2/1995 | Sawada et al. | 360/132 X |

FOREIGN PATENT DOCUMENTS 61-94287  5/1986  Japan .................................. 360/132

OTHER PUBLICATIONS

IBM/TDB "Low Cost Cartridge Code Detector" by Craft vol. 25, No. 4, Sep. 1982, pp. 1980–1981.

*Primary Examiner*—John H. Wolff
*Attorney, Agent, or Firm*—Birch, Stewart, Kolasch & Birch

[57] ABSTRACT

A tape system for implementing tape cassettes of variable size which includes both large-sized and small-sized tape cartridges each housing a memory element having a set of terminals for electric connection with corresponding terminals of a tape player, the level at which the terminals of the memory element in the large-sized tape cartridge are positioned and the level at which the terminals of the memory element in the small-sized tape cartridge are positioned are the same level, spaced from a longitudinal mid center line of the length of magnetic tape, intermediate of the width thereof or a reference plane in which a reel support lies.

5 Claims, 6 Drawing Sheets

TAPE CARTRIDGE SYSTEM IMPLEMENTING VARIABLE SIZED TAPE CARTRIDGES DESIGNED FOR USE ON THE SAME RECORDING/REPRODUCING APPARATUS

BACKGROUND OF THE INVENTION

1. Field of the Invention

The present invention generally relates to tape cartridges having reeled lengths of magnetic recording tapes and employing data memory elements. More particularly, the present invention relates to tape cartridges of a two-way system comprising a large-sized tape cartridge and a small-sized tape cartridge each including a reeled length of magnetic recording tape of the same width and employing the same data memory element to be used in conjunction with the same tape player.

2. Description of the Related Art

A tape cartridge such as, for example, a 8-mm video tape cartridge or a VHS video tape cartridge, in which a memory element for storage of such data associated with recording in the recording mode, as recorded voice data and/or preset parameters, has been well known in the art. Such a tape cartridge is disclosed in, for example, the Japanese Laid-open Patent Publications No. 63-166085, published Jul. 7, 1988, and No. 63 -164085, published Jul. 9, 1988. According to these patent publications, terminals of the memory element are exposed to the outside of the cartridge casing so that, when the tape cartridge is loaded in a video tape player, the terminals of the memory element can be automatically connected electrically with corresponding terminals disposed in the video tape player.

As a tape cartridge for use with this type of video tape player, a two-way system has been suggested which includes a small-sized tape cartridge which is designed so compact as to enable it to be used outdoors, and a large-sized tape cartridge of a stay-at-home model for long-time use at home.

In the large-sized and small-sized tape cartridges of the two-way system, since the length of magnetic recording tape of the same width is employed for compatibility, they both are generally set to have an equal thickness.

However, in terms of the physical strength of the casing and securement of closure the reel holes, it is preferred that the large-sized tape cartridge be set to have a greater thickness than that of the small-sized tape cartridge.

Then, a problem arises that, if the large-sized and small-sized tape cartridges have different thicknesses, the position at which the terminals of the memory element in the large-sized tape cartridge will be different from that in the small-sized tape cartridge and the video tape player will fail to accommodate them. In other words, in order for either one of the large-sized and small-sized tape cartridges to be accommodated by the video tape player in reference to a position intermediate of the width thereof, the video tape player will have to have two set of corresponding terminals disposed at different levels corresponding to the positions of the terminals of the respective memory elements in the large-sized and small-sized tape cartridges, respectively, thereby requiring the internal mechanism of the video tape player to be complicated. This in turn beings about an increase in cost.

SUMMARY OF THE INVENTION

In view of the foregoing, the present invention is intended to provide the capability whereby the terminals in the video tape player may be concurrently used for both of the terminals of the memory element in the large-sized tape cartridge and the terminals of the memory element in the small-sized tape cartridge to simplify the mechanism of the video tape player and reduction in cost thereof.

To this end, the tape cartridge of the two-way system according to the present invention is featured in that the level at which the terminals of the memory element in the large-sized tape cartridge are installed and the level at which the terminals of the memory element in the small-sized tape cartridge are installed are defined at the same level, spaced from a longitudinal mid center line of the length of magnetic tape intermediate of the width thereof or a reference plane in which a reel support lies.

According to the present invention, the same terminals disposed in the video tape player can be concurrently utilized for connection with either one of the terminals of the memory element in the small-sized tape cartridge and the terminals of the memory element in the large-sized tape cartridge. Therefore, the video tape player need not be provided with two sets of terminals, which would be required if the memory elements are housed within the large-sized and small-sized tape cartridges at respectively different positions. This brings about such an advantage that the mechanism of the video tape player can be rendered compact in size and inexpensive.

BRIEF DESCRIPTION OF THE DRAWINGS

This and other objects and features of the present invention will become clear from the following description taken in conjunction with the preferred embodiments thereof and with reference to the accompanying drawings, in which like parts are designated by like reference numerals and in which.

DETAILED DESCRIPTION OF THE INVENTION

Figure 2:
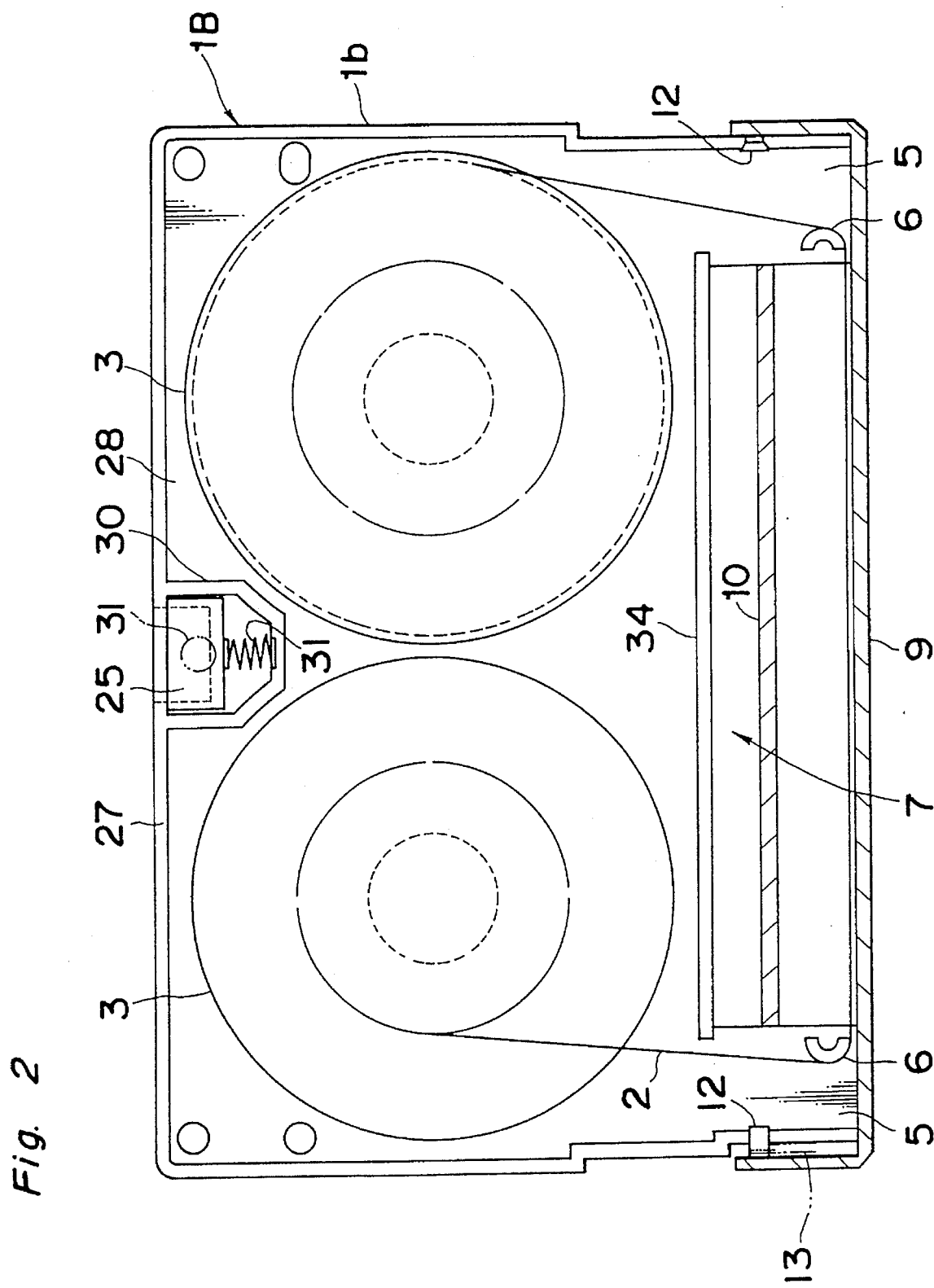
FIG. 2 is a top plan view, with an upper casing half removed, showing the interior of the small-sized tape cartridge embodying the present invention.
Figure 3:
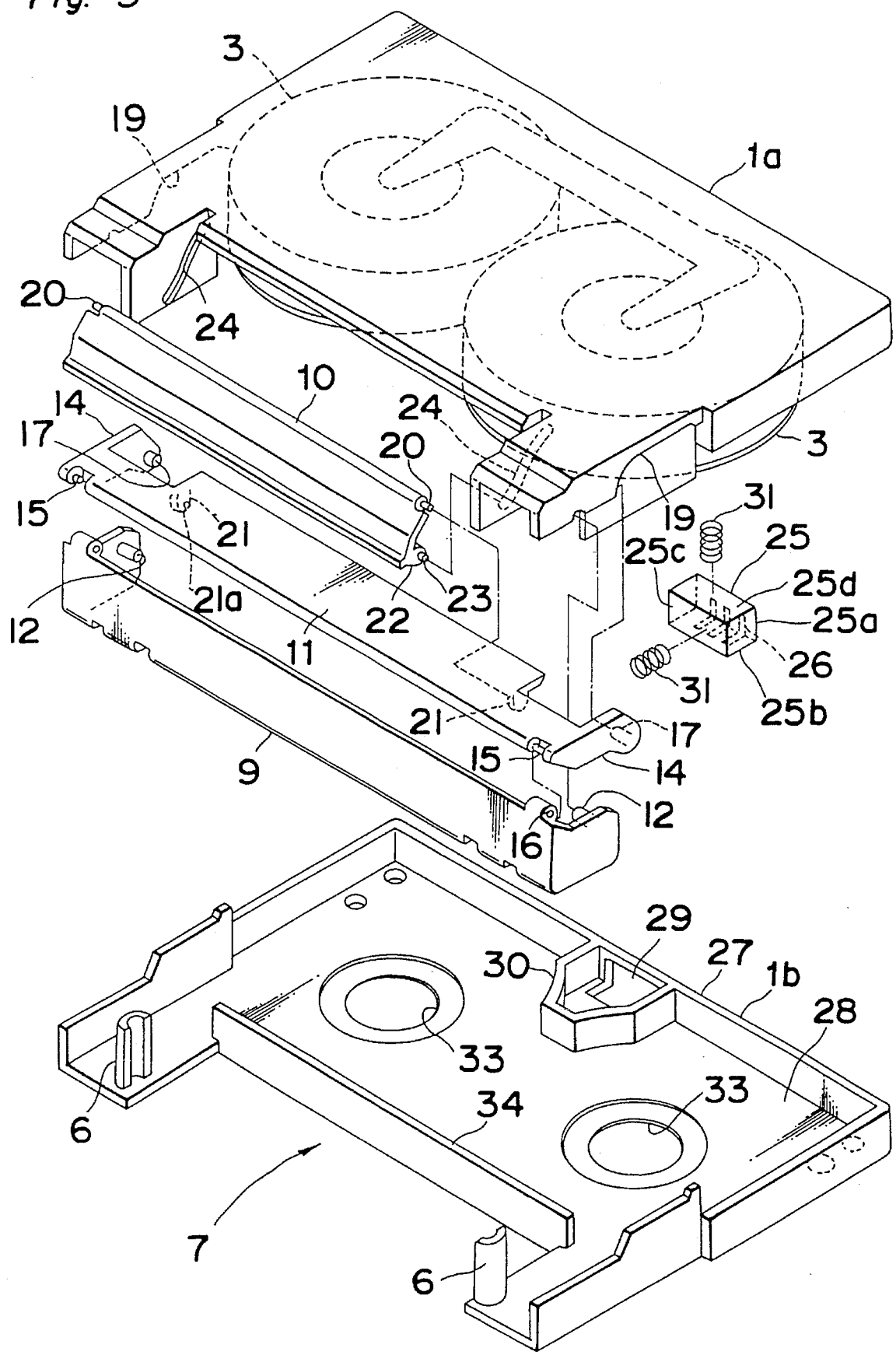
FIG. 3 is an exploded view of the small-sized tape cartridge.

Referring now to the drawings, FIGS. 2 to 7 illustrate one of the tape cartridges of a two-way system, that is, the small-sized tape cartridge C2. Referring particularly to FIGS. 2 and 3, the small-sized tape cartridge C2 comprises a casing 1B made up of top and bottom casing halves 1a and 1b jointed together to define the generally rectangular box-like casing 1B. The casing 1B so formed has a tape chamber defined therein and accommodating a pair of reels 3 to which opposite ends of a length of magnetic recording tape 3 are anchored, respectively. The length of magnetic tape drawn from one of the reels 3 is wound around the other of the reels 3 after having been guided by tape guides 6 disposed in tape guide arms 5 at a front of the tape cartridge C2. At a front center portion of the casing 1B, the small-sized tape cartridge C2 has a pocket 7 defined between the tape guide arms 5 so as to open upward, downward, and frontward thereof. A portion of the length of magnetic recording tape 2 shown traversing the pocket 7 is protected by a lid assembly including a generally rectangular front 9, rear 10 and upper lid 11, respectively.

Figure 7:
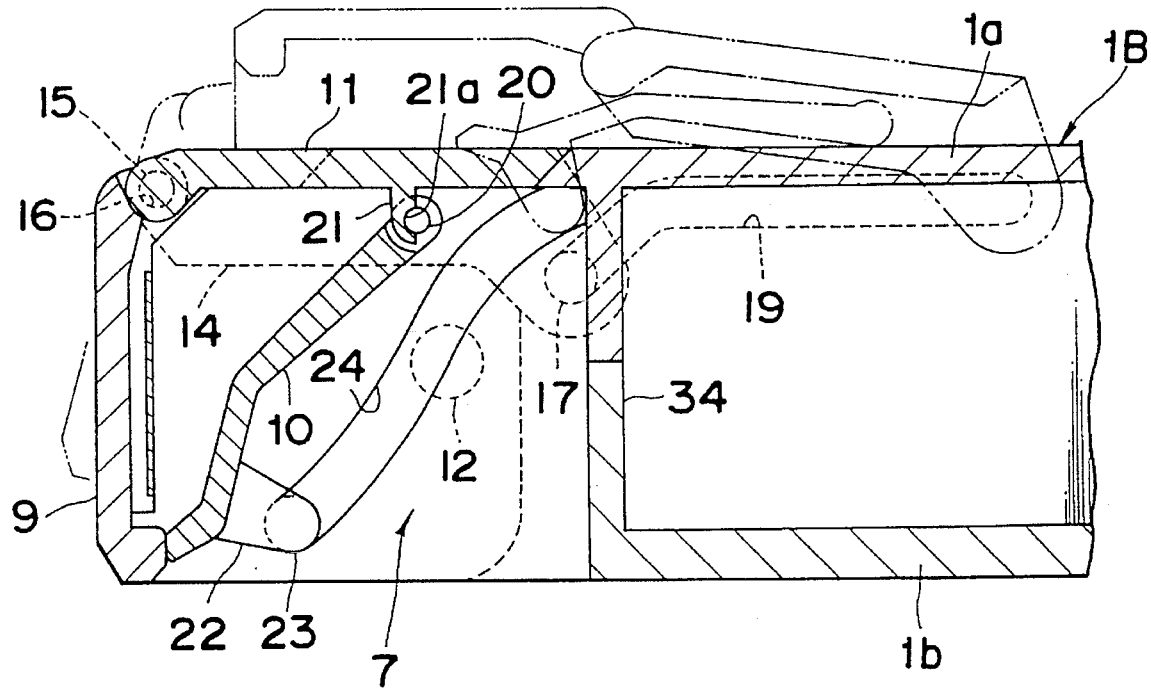
FIG. 7 is a fragmentary side sectional view of a pocket area of the small-sized tape cartridge.

As best shown in FIG. 7, the front lid 9 is pivotally supported by left-hand and right-hand stud shafts 12 for pivotal movement about a hinge axis, defined by the stud shafts 12, between a closed position, at which respective front openings of the tape guide arms 5 and a front portion of the pocket 7 are closed as shown by the solid line, and an open position as shown by the phantom line. This front lid 9 is normally biased towards the closed position by a biasing spring 13, shown in FIG. 2, mounted on one of the stud shafts 12.

The upper lid 11 is operatively associated with the front lid 9 and is pivotable between a closed position, at which an upper portion of the pocket 7 is closed, as shown by the solid line in FIG. 7, and an open position at which the lid 11 has been shifted upward and rearward of the pocket 7, as shown by the phantom line in FIG. 7. For this purpose, the upper lid 11 has its opposite ends formed with respective arms 14 having connecting pins 15 at front ends thereof, these connecting pins 15 being rotatably engaged in associated bearing holes 16 which are formed on left-hand and right-hand portion of the upper edge of the front lid 9. The arms 14 integral with the upper lid 11 also have slide pins 17 at the rear ends thereof, the slide pins 17 being slidably engaged in cammed guide grooves 19 which are defined in left-hand and right-hand side walls of the casing 1B.

Referring particularly to FIGS. 3 and 7, the rear lid 10 has its opposite ends formed with connecting pins 20 extending from an upper edge thereof in a direction away from each other and is pivotally mounted on the upper lid 11 with the connecting pins 20 rotatably engaged in pin holes 21a which are defined in respective bosses 21 formed on an inner surface of the upper lid 11. This rear lid 10 also has left-hand and right-hand legs 22 formed integrally with a lower rear surface thereof, and slide pins 23 formed integrally with the respective legs 22 so as to protrude laterally outwardly therefrom, the slide pins 23 being slidably engaged in generally S-shaped guide grooves 24 defined in left-hand and right-hand side walls of the casing 1B defining the pocket 7. Accordingly, this rear lid 10 is operatively associated with the front lid 9 and the upper lid 11 so as to pivotally move between a back-up position, at which the rear lid 10 occupies a position immediately rearwardly of that portion of the length of magnetic tape 2 traversing the pocket 7, as shown by the solid line in FIG. 7, and a clear position at which, as shown by the phantom line in FIG. 7, the rear lid 10 occupies a position upwardly and rearwardly of the pocket 7 and generally below the upper lid 11 then held in the opened position.

Figure 4:
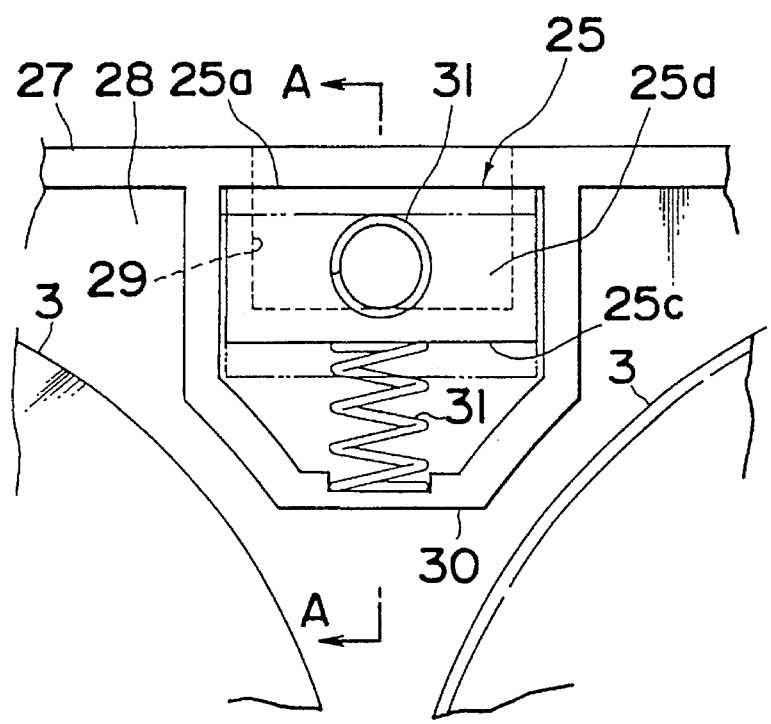
FIG. 4 is a top plan view, on an enlarged scale, of an portion of the small-sized tape cartridge showing a manner in which a memory element is accommodated.
Figure 5:
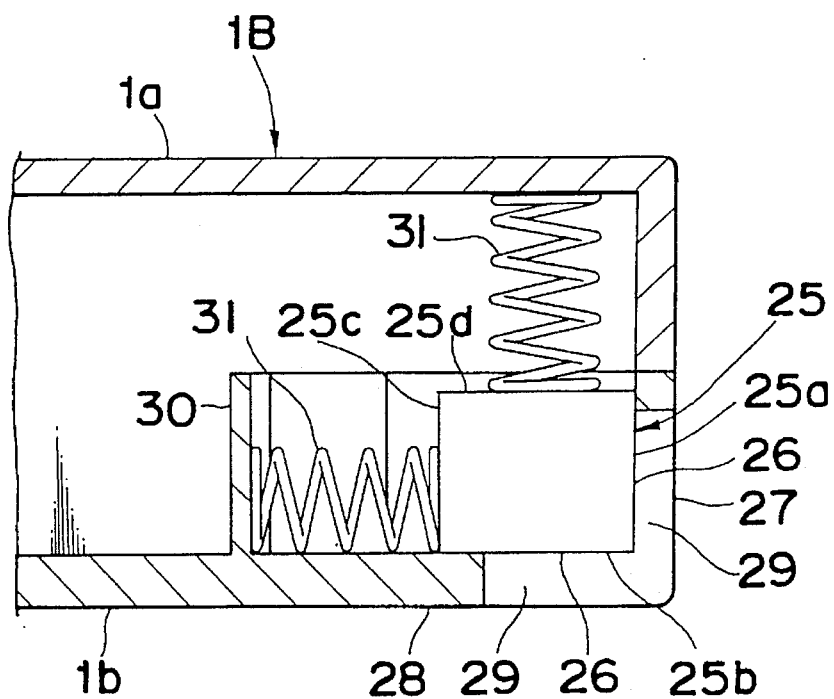
FIG. 5 is a cross-sectional view taken along the line A—A in FIG. 4.
Figure 6:
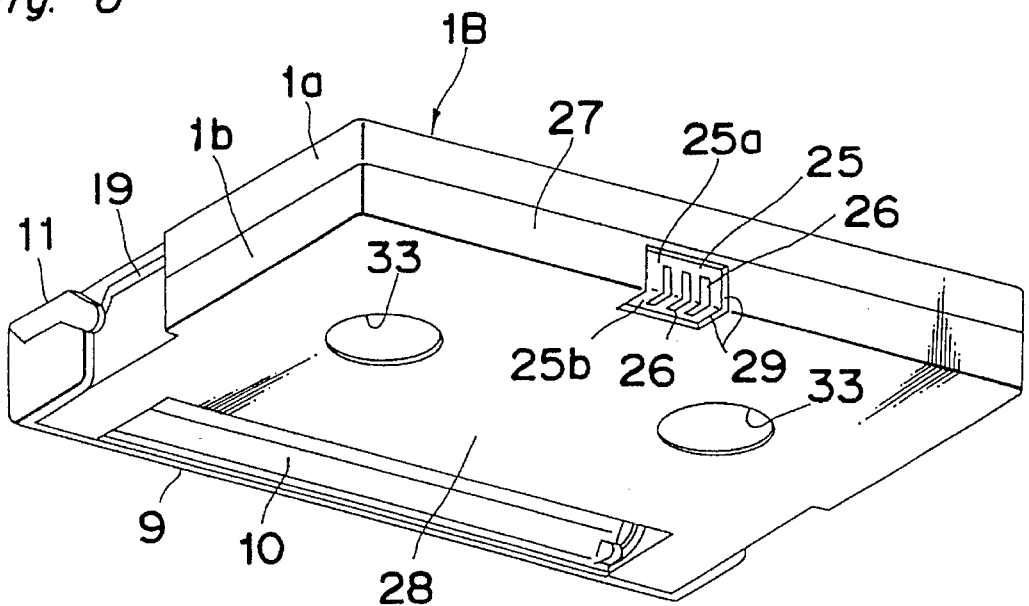
FIG. 6 is a perspective view of the small-sized tape cartridge as viewed from bottom rear.

As shown in FIGS. 4 and 5, the casing 1B has a memory element 25 housed therein. This memory element 25 is a unitary structure of a generally cubic configuration including a read only memory (ROM) storing fixed data such as, for example, the specification of and/or characteristic data descriptive of the magnetic tape 2 used, a random access memory for storage of variable data such as, for example, data presettable during recording and a battery all incorporated therein. As shown in FIGS. 3 and 6, the memory element 25 has a set of terminals 26 which are exposed to the outside in part from a rear face 25a and in part from a bottom face 25b, this set of terminals 26 being adapted to be electrically connected with a corresponding number of terminals (not shown) installed in a video tape player (also not shown).

The memory element 25 is mounted in the casing 1B with the set of terminals 26 exposed to the outside of the casing 1B through two adjoining wall segments of the casing 1B. In the illustrated embodiment, the memory element 26 having the set of terminals 26 is mounted in the casing 1B so that the set of the terminals 26 are exposed to the outside of the casing 1B in part through a rear wall segment 27 and a bottom wall segment 28 perpendicular to the rear wall segment 27. For this purpose, a portion of the rear wall segment 27 of the casing 1B intermediate of the width of the casing 1B and a portion of the bottom wall segment 28 adjacent the rear wall segment 27 and intermediate of the width of the casing 1B are formed with respective openings 29 which are continuous with each other so that, when the memory element 25 is mounted in position within the casing 1B, the rear and bottom faces 25a and 26b are exposed to the outside of the casing 1B through the openings 29. Although the openings 29 may be separate from each other, that the openings 29 are continuous or communicate with each other, such as shown in FIGS. 3 and 6, is particularly advantageous in that, during a plastic molding to form the bottom casing half 1b, no undercut is necessarily formed and, therefore, mold separation can be facilitated.

Those portions of the rear and bottom wall segments 27 and 28 with the respective openings 29 are located in alignment with a generally triangular blind spot, delimited by the rear wall segment 27 and the rolls of magnetic tape 2 around the respective reels 3 and, therefore, no extra space for installation of the memory element 25 is required. In other words, the present invention makes maximum use of such blind spot to accommodate the memory element 25.

The memory element 26 so positioned as hereinbefore described has opposite end faces and a front face 25c, opposite to the rear face 25a, all surrounded by a surrounding rib 30 formed integrally with the bottom wall segment 28, this surrounding rib 30 being so configured as to separate the memory chamber from the tape chamber within the casing 1B. As best shown in FIGS. 4 and 5, in order to ensure a firm electric connection between the terminals 26 of the memory element 25 and the corresponding terminals in the video tape player, elastic elements 31 such as, for example, compression springs, are interposed between the front face 25c of the memory element 25 and the surrounding rib 30 and a top face 25d of the memory element 25 and a top wall segment of the casing 1B (i.e., a top panel of the upper casing half 1a), respectively. Thus, it will readily be understood that the memory element 25 is normally biased rearwardly and downwardly of the casing 1B with the set of the terminals 26 situated within the openings 29.

With the memory element 25 so urged by the elastic members 31 as described above, the casing 1B is provided with means for regulating the stroke of the rearward and downward movement of the memory element 25. This can be accomplished by choosing the width of each of the openings 29, as measured in a direction parallel to a reel-to-reel direction, to be smaller than the width of each of the rear and bottom faces 25a and 25b of the memory element 25, as measured in a corresponding direction, so that the rear and bottom faces 25a and 25b of the memory element 25 will not outwardly protrude through the respective openings 29, with their peripheral regions held in abutment with the inner peripheral surface areas of the rear and bottom wall segments 27 and 28.

Figure 8:
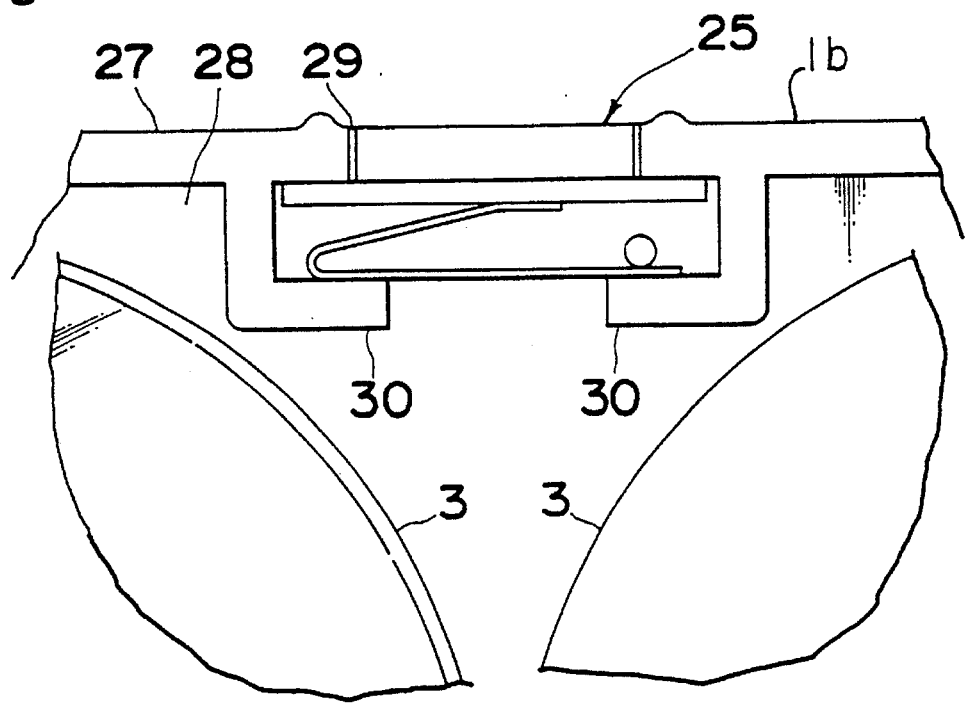
FIG. 8 is a view similar to FIG. 4, showing another manner in which the memory element is accommodated.
Figure 9:
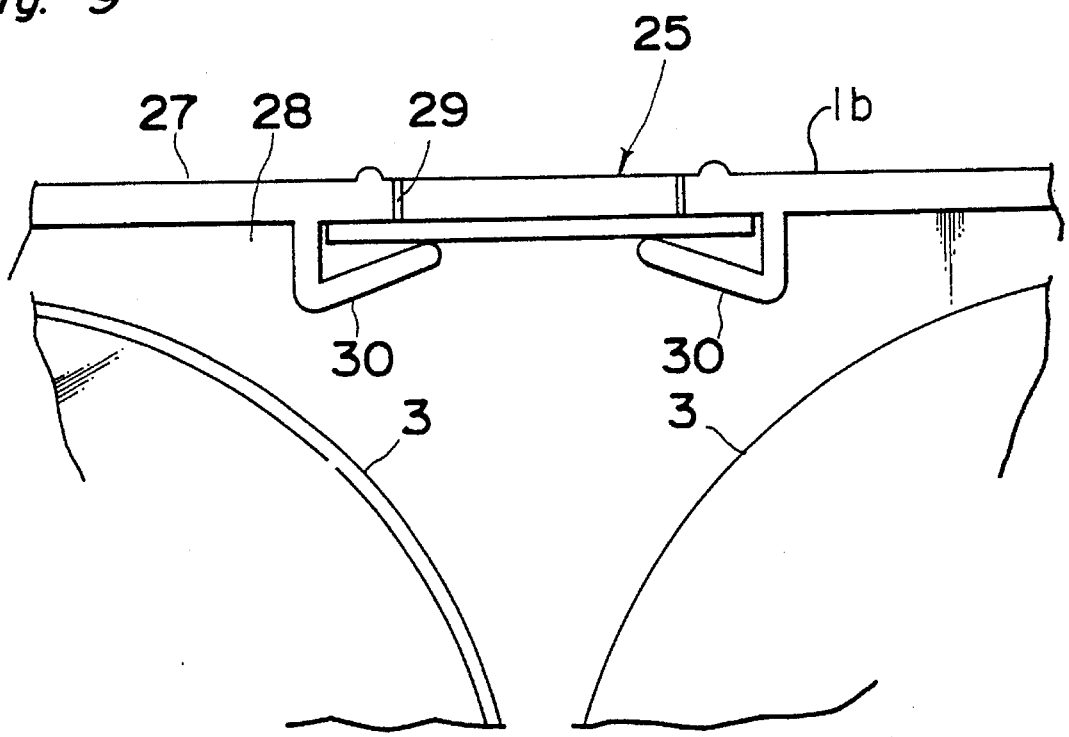
FIG. 9 is a view similar to FIG. 4, showing a modified manner in which the memory element is accommodated.

It is to be noted that, for the elastic members 31, torsional springs or leaf springs may be employed in place of the compression springs that are employed in the illustrated embodiment. The use of the leaf springs for the elastic members 31 is illustrated in FIG. 8. It is also to be noted that the elastic members 31 may not be always limited to springs made of metal or non-metal and separate from the casing 1B, but may be a spring-like rib 30 made of plastic and formed integrally with the casing 1B, as shown in FIG. 9.

As hereinbefore described, the set of the terminals 26 of the memory element 25 accommodated within the casing 1B is exposed to the outside of the casing 1B in part through the opening 29 in the rear wall segment 27 and in part through the opening 29 in the bottom wall segment 28 and, therefore, regardless of whether the corresponding terminals in the video tape player are disposed so as to confront the rear face 25a of the memory element 25 or whether they are disposed so as to confront the bottom face 25b thereof, the set of the terminals 26 of the memory element 25 can be reliably and firmly connected electrically with the set of the corresponding terminals in the video tape player once the tape cartridge embodying the present invention is loaded in the video tape player. This is possible because, once the electric connection is established between the set of the terminals 26 of the memory element 25 and the corresponding terminals in the video tape player, the elastic members 31 accumulate respective biasing forces whereby the contact pressure between the terminals 26 of the memory element 25 and the corresponding terminals in the video tape player is increased.

Also, the elastic members 31 used to bias the memory element 25 have an additional function of absorbing shock imposed on the memory element 25 either directly or indirectly. More specifically, in the event that the tape cartridge is inadvertently dropped onto a ground and an external shock is consequently applied to the memory element either directly or through the casing 1B, the memory element may be displaced in position. However, such possible displacement of the memory element 25 is accommodated by one or both of the elastic members 31 to cushion the memory element, thereby minimizing the possibility of some of the terminals 26, or the memory element 25 itself, being damaged.

Figure 1:
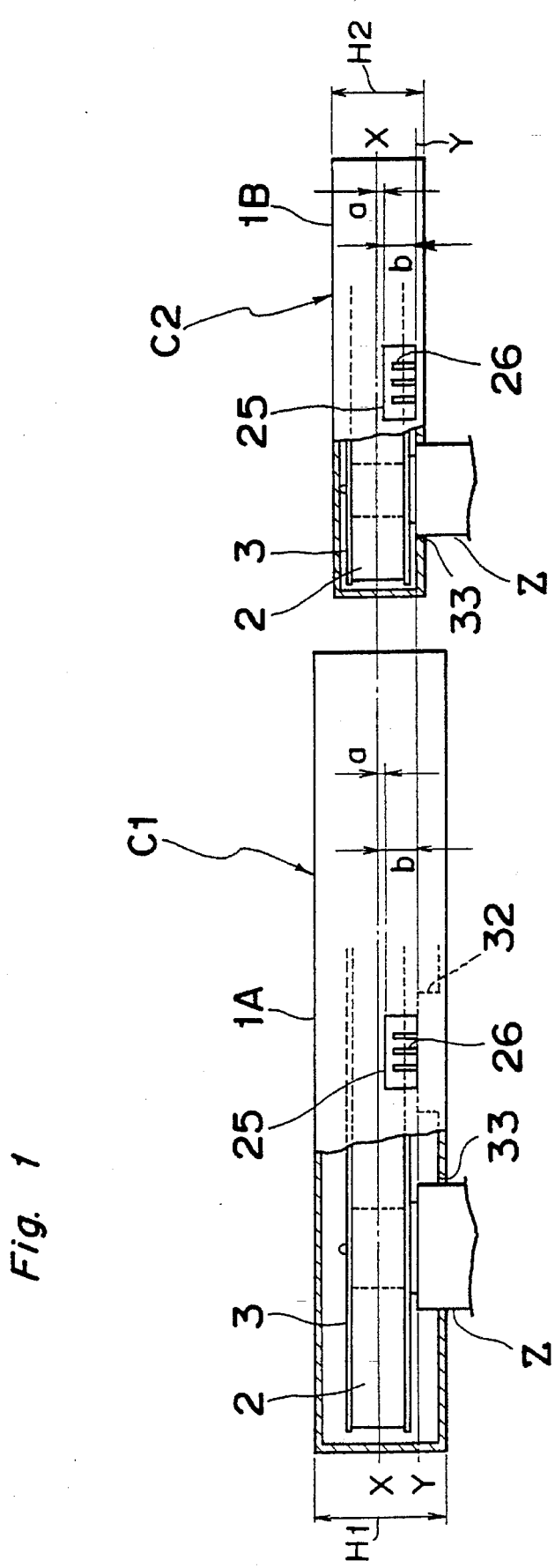
FIG. 1 is a rear view, with portions cut away, showing large-sized and small-sized tape cartridges in side-by-side fashion for comparison purpose.

While the foregoing description is made in connection with the small-sized tape cartridge C2, the large-sized tape cartridge C2 is shown in FIG. 1 in comparison with the small-sized tape cartridge, having a basic structure substantially identical with that of the small-sized tape cartridge. In other words, the large-sized tape cartridge C1 comprises, as is the case with the small-sized tape cartridge, a casing 1A made up of top and bottom casing halves joined together to define the generally rectangular box-like casing 1A. The casing 1B so formed has a tape chamber defined therein and accommodating a pair of reels 2 to which opposite ends of a length of magnetic recording tape 3 are anchored, respectively. Also, similarly, the casing 1A includes front 9, rear 10 and upper lids 11 all operatively associated with each other and, again, includes a memory element 25 of the same size housed therein at the same position and in the same manner as that employed in the small-sized tape cassette.

However, the large-sized tape cartridge C1 differs from the small-sized tape cartridge C2 in that the casing 1A of the large-sized tape cartridge C1 has a heightwise dimension or thickness H1 greater than the heightwise dimension or thickness H2 of the casing C2 of the small-sized tape cartridge C2. This is because the casing C1 accommodates a greater length of magnetic recording tape 2 than that in the casing C2 of the small-sized tape cartridge and does therefore require a correspondingly increased rigidity.

To secure compatibility with the small-sized tape cartridge C2, the length of magnetic recording tape 2 having the same width as that of the magnetic recording tape 2 accommodated in the small-sized tape cassette C2 is wound around the reels 3 in the casing C1. In FIG. 1, reference character X represents the heightwise position or level at which a longitudinal mid-center line of the magnetic tape 2 intermediate of the width thereof lies during the travel of the length of magnetic recording tape 2 from one reel 3 to the other reel 3, and this position X remains the same in both of the large-sized and small-sized tape cartridges C1 and C2.

The heightwise position of the set of the terminals 26 of the memory element 25 employed in the large-sized tape cartridge C1 is chosen to be at a position spaced a distance $\alpha$ from the heightwise position or level X at which the longitudinal mid-center line of the magnetic tape 2 lies. In other words, the heightwise position of the set of the terminals 26 of the memory element 25 employed in the large-sized tape cartridge C1 is chosen to be the same as that of the set of the terminals 26 of the memory element 25 employed in the small-sized tape cartridge C2. For this purpose, and considering that the memory element 25 of the same size is employed in both of the large-sized and small-sized tape cartridges C1 and C2, the casing 1A of the large-sized tape cartridge C1 has a heightening rib 32 formed on an inner surface of the bottom wall segment thereof, and the memory element 25 is mounted on this heightening rib 32 thereby to render the heightwise position of the set of the terminals 26 of the memory element 25 in the large-sized tape cartridge C1 to be the same as that of the set of the terminals 26 of the memory element 25 in the small-sized tape cartridge C2.

Thus, when both the heightwise position of the set of the terminals 26 of the memory element 25 employed in the large-sized tape cartridge C1 and the heightwise position of the set of the terminals 26 of the memory element 25 employed in the small-sized tape cartridge C2 are chosen as to be spaced the distance $\alpha$ from the heightwise position or level X at which the longitudinal mid-center line of the magnetic tape 2 lies, the set of the corresponding terminals in the video tape player which are disposed at the same heightwise position can be concurrently used for both of the set of the terminals 26 of the memory element 25 employed in the small-sized tape cartridge C2 and the set of the terminals 26 of the memory element 25 employed in the large-sized tape cartridge C1.

In the illustrated embodiment, in determining the position of the memory element 25 employed in both of the large-sized and small-sized tape cartridges C1 and C2, reference has been made to the heightwise position or level X at which the longitudinal mid-center line of the magnetic tape 2 lies. However, reference may be made to a reel support Z employed in the video tape player as will now be described with reference to FIG. 1.

When either one of the large-sized and small-sized tape cartridges C1 and C2 is set in position loaded within the video tape player, one of the reels 3, which is exposed to the outside through a reel hole 33 defined in the bottom wall segment of the corresponding tape cartridge C1 or C2, has a lower end face supported on the reel support Z, as shown.

The heightwise dimension b from the reel support Z in the video tape player remains the same for each of the large-sized and small-sized tape cartridges C1 and C2. Stated another way, the level in which the reel support Z lies is spaced an equal distance b from the heightwise position or level X regardless of the size of the tape cartridges C1 and C2.

Accordingly, even where the heightwise position of the set of the terminals 26 of the memory element 25 in the large-sized tape cartridge C1 and those in the small-sized tape cartridge C2 are chosen in reference to the reel support Z in the video tape player so as to be spaced the heightwise dimension or distance b, the set of the corresponding terminals in the video tape player which are disposed at the same heightwise position can be concurrently used for both of the set of the terminals 26 of the memory element 25 employed in the small-sized tape cartridge C2 and the set of the terminals 26 of the memory element 25 employed in the large-sized tape cartridge C1.

Although the present invention has been described in connection with certain preferred embodiments thereof with reference to the accompanying drawings, it is to be noted that various changes and modifications are apparent to those skilled in the art. By way of example, in each of the large-sized and small-sized tape cartridges C1 and C2, the position where the memory element 25 is housed may be an intermediate portion of a partition wall 34 partitioning the pocket 7 from the tape chamber, which is intermediate of the width thereof.

Also, the surrounding rib 30 and the rear wall segment 27 defining the cavity for housing the memory element 25, such as shown in FIGS. 4, 8 and 9, may be in the form of a holder separate from the corresponding casing 1A or 1B and, in such case, molding material for the formation of the holder may be plastic or rubber containing a chemical destaticizer (antistatic additive), such as non-ionic, anionic or cationic surfactant, and electroconductive filler, such as carbon black or metallic particles. The holder may have its surface coated with an electroconductive paint, electroplated, sprayed with metal, plated with metal foil or treated in any suitable manner. In this way, since the holder is capable of dissipating electrostatic charge, the memory element 25 can be protected from electrostatic charge.

Accordingly, any changes and modifications are to be understood as included within the scope of the present invention as defined by the appended claims, unless they depart therefrom.

What is claimed is:

1. A tape cartridge system of variable sized tape cartridges capable of recording and/or reproducing information from the same recording and/or reproducing apparatus which comprises;

a large-size tape cartridge including a first casing having a first height or thickness and including a pair of first reels housed therein and a first magnetic tape of a first length having opposite ends anchored to said first reels, said first casing also including a first memory element having a first set of terminals, said first memory element being housed within said first casing with said first set of terminals being exposed to the outside through at least a rear wall of said first casing, at a first heightwise position which is spaced a predetermined first distance from a level at which a longitudinal mid-center line of said first magnetic tape, intermediate of the width thereof, lies; and a small-size tape cartridge including a second casing having a second height or thickness and including a pair of second reels and a second magnetic tape of a second length having opposite ends anchored to said second reels, said second casing also including a second memory element having a second set of terminals, said second memory element being housed within said second casing with said second set of terminals being exposed to the outside through at least a rear wall of said second casing, at a second heightwise position which is spaced a predetermined second distance from a level at which a longitudinal mid-center line of said second magnetic tape, intermediate of the width thereof, lies;

said first and second heights or thicknesses of said cartridges being different from each other while said first and second lengths of magnetic tape have respective widths equal to each other, and said predetermined first and second distances are equal to each other, whereby connecting terminals disposed in said recording and/or reproducing apparatus can be concurrently used for connection with either of said first or second memory elements of said large-size or small-size tape cartridge.

2. The tape cartridge system as in claim 1, wherein each of said first and second casings has an opening defined in at least a rear wall thereof through which said sets of the terminals of said memory elements are exposed to the outside, each of said openings having a width, as measured in a direction widthwise of said cartridge, which is smaller than a width of each corresponding memory element.

3. The tape cartridge system as in claim 2, further including an elastic means housed within any one of said first and second casings for biasing said respective memory element toward said opening defined in said respective casing.

4. The tape cartridge system as in claim 1, wherein said set of terminals of said memory element in either one of said first and second respective casings is exposed to the outside of said respective casing, in part, through said rear wall of said respective casing and, in part, through an adjoining bottom wall of said respective casing.

5. The tape cartridge system of claim 1, wherein said predetermined first and second distances are measured from a common reel support for each of said first and second casings to said first and second heightwise positions of said first and second memory elements.

* * * * *